US006468496B2

(12) United States Patent
Jones et al.

(10) Patent No.: US 6,468,496 B2
(45) Date of Patent: Oct. 22, 2002

(54) PROCESS FOR PRODUCING HYDROGEN PEROXIDE

(75) Inventors: C. Andrew Jones, Newtown Square, PA (US); Roger A. Grey, West Chester, PA (US)

(73) Assignee: Arco Chemical Technology, L.P., Greenville, DE (US)

( * ) Notice: Subject to any disclaimer, the term of this patent is extended or adjusted under 35 U.S.C. 154(b) by 7 days.

(21) Appl. No.: 09/742,807

(22) Filed: Dec. 21, 2000

(65) Prior Publication Data

US 2002/0119092 A1 Aug. 29, 2002

(51) Int. Cl.⁷ ................................................ C01B 15/02
(52) U.S. Cl. ........................................................ 423/584
(58) Field of Search ........................................... 423/584

(56) References Cited

U.S. PATENT DOCUMENTS

| 4,007,256 A | * | 2/1977 | Kim et al. | 423/584 |
| 4,279,883 A | * | 7/1981 | Izumi et al. | 423/584 |
| 4,367,342 A | | 1/1983 | Wulff et al. | 549/529 |
| 5,320,821 A | | 6/1994 | Nagashima et al. | 423/584 |
| 5,505,921 A | * | 4/1996 | Kückoff et al. | 423/584 |
| 5,623,090 A | | 4/1997 | Haruta et al. | 568/360 |
| 5,961,948 A | * | 10/1999 | Wanngård | 423/584 |
| 6,011,162 A | | 1/2000 | Han et al. | 549/529 |
| 6,168,775 B1 | * | 1/2001 | Zhou et al. | 423/584 |
| 6,210,651 B1 | * | 4/2001 | Nyström et al. | 423/584 |
| 6,299,852 B1 | * | 10/2001 | Nyström et al. | 423/584 |

FOREIGN PATENT DOCUMENTS

JP  07-241473  9/1995

* cited by examiner

*Primary Examiner*—Wayne A. Langel
(74) *Attorney, Agent, or Firm*—Kevin M. Carroll

(57) ABSTRACT

A supported gold-containing catalyst is effective for producing hydrogen peroxide from the direct liquid-phase reaction of hydrogen and oxygen.

9 Claims, No Drawings

PROCESS FOR PRODUCING HYDROGEN PEROXIDE

FIELD OF THE INVENTION

This invention relates to a process for production of hydrogen peroxide from hydrogen and oxygen with a gold-containing supported catalyst. Surprisingly, this catalyst system produces hydrogen peroxide in the liquid-phase reaction of hydrogen and oxygen.

BACKGROUND OF THE INVENTION

Many different methods for the preparation of hydrogen peroxide have been developed. Commercially, the most common method of produce hydrogen peroxide is the "anthraquinone" process. In this process, hydrogen and oxygen react to form hydrogen peroxide by the alternate oxidation and reduction of alkylated anthraquinones in organic solvents. A significant disadvantage of this process is that it is costly and produces a significant amount of by-products that must be removed from the process. On account of these problems, much research has been conducted with the goal of developing an alternative to the anthraquinone process.

One promising method involves the direct production of hydrogen peroxide by the reaction of hydrogen and oxygen in the presence of a catalyst. Various catalysts have been developed for the direct production of hydrogen peroxide. Typical catalysts include palladium-containing catalysts, although other metals such a gold can be added as additional components as an alloy or a mixture (see e.g. U.S. Pat. No. 5,320,821).

JP 07-241473 discloses a process whereby hydrogen peroxide is produced by the reaction of hydrogen and oxygen in an acidic aqueous solution in the presence of the catalyst comprising fine gold particles supported on hydrophobic carrier. The hydrophobic carrier includes silicalite, polyethylene, polypropylene, and polytetrafluoroethylene.

As with any chemical process, new catalysts are desired. We have discovered an effective, convenient catalyst for the direct production of hydrogen peroxide from hydrogen and oxygen.

SUMMARY OF THE INVENTION

The invention is a process to produce hydrogen peroxide that comprises reacting hydrogen and oxygen in an oxygenated solvent in the presence of a supported catalyst comprising gold and a support, wherein the support is a non-zeolitic inorganic oxide containing titanium or zirconium. It is surprisingly found that the catalyst produces hydrogen peroxide.

DETAILED DESCRIPTION OF THE INVENTION

The process of the invention employs a supported catalyst comprising gold and a support. The support is non-zeolitic inorganic oxide that contains titanium or zirconium. The amount of titanium or zirconium present in the support is preferably in the range from about 0.1 to about 75 weight percent. Preferred supports include titania, zirconia, and amorphous titania-silica or zirconia-silica. These non-zeolitic supports are hydrophilic in nature.

Titania-silicas or zirconia-silicas comprise an inorganic oxygen compound of silicon in chemical combination with an inorganic oxygen compound of titanium or zirconium (e.g. an oxide or hydroxide of titanium or zirconium). The inorganic oxygen compound of titanium or zirconium is preferably combined with the oxygen compound of silicon in a high positive oxidation state, e.g., as tetravalent titanium or zirconium. The amount of titanium (zirconium) contained in the titania(zirconia)-silica support can be varied. Typically, the support contains at least 0.1% by weight of titanium or zirconium with amounts from about 0.2% by weight of about 50% by weight being preferred and amounts from about 0.2% to about 10% by weight being most preferred. Titania(zirconia)-silicas are well-known in the art and are described, for example, in U.S. Pat. Nos. 4,367,342 and 6,011,162.

The supported catalyst useful in the process of the invention also contains gold. The typical amount of gold present in the catalyst will be in the range of from about 0.01 to 20 weight percent, preferably 0.01 to 10 weight percent, and most preferably 0.01 to 5 weight percent. While various methods known to those skilled in the art may be used, preferably the gold may be supported by a deposition-precipitation method in which a gold compound is deposited and precipitated on the surface of the support by controlling the pH and temperature of the aqueous gold solution (as described in U.S. Pat. No. 5,623,090).

There are no particular restrictions regarding the choice of gold compound used in the preparation of the supported catalyst. For example, suitable compounds include gold halides (e.g., chlorides, bromides, iodides), cyanides, and sulfides. Chloroauric acid is particularly useful.

The supported catalyst may be used in the process of the invention as a powder or as a pellet or extrudate. If pelletized or extruded, the supported catalyst may additionally comprise a binder or the like and may be molded, spray dried, shaped or extruded into any desired form prior to use in epoxidation.

The process of the invention comprises contacting hydrogen and oxygen in an oxygenated solvent in the presence of the supported catalyst. The oxygenated solvent may be any chemical that is a liquid under reaction conditions that contains at least one oxygen atom in its chemical structure. Suitable oxygenated solvents include water and oxygen-containing hydrocarbons such as alcohols, ethers, esters, ketones, and the like. Preferred oxygenated solvents include lower aliphatic $C_{1-C4}$ alcohols such as methanol, ethanol, isopropanol, and tert-butanol, or mixtures thereof, and water. Fluorinated alcohols can be used. It is also possible to use mixtures of the cited alcohols with water. Particularly preferred oxygenated solvents include water, methanol, and a mixture of methanol and water. For mixtures of methanol and water, the molar ratio of methanol:water is preferably within the range of from about 3 to about 6.

Oxygen and hydrogen are also required for the process of the invention. Although any sources of oxygen and hydrogen are suitable, molecular oxygen and molecular hydrogen are preferred. The molar ratio of hydrogen to oxygen can usually be varied in the range of $H_2:O_2=1:10$ to $5:1$ and is especially favorable at 1:2 to 2:1.

In addition to oxygen and hydrogen, an inert gas carrier may be preferably used in the process. As the carrier gas, any desired inert gas can be used. Suitable inert gas carriers include noble gases such as helium, neon, and argon in addition to nitrogen, methane, and carbon dioxide. Nitrogen is the preferred inert carrier gas. Mixtures of the listed inert carrier gases can also be used.

For the liquid-phase process of the invention, the catalyst is preferably in the form of a suspension or fixed-bed. The process may be performed using a continuous flow, semi-batch or batch mode of operation. It is advantageous to work at a pressure of 1–100 bars. The reaction process according to the invention is carried out at a temperature effective to achieve the desired hydrogen peroxide formation, preferably at temperatures in the range of 0–100° C., more preferably, 20–60° C.

The following examples merely illustrate the invention. Those skilled in the art will recognize many variations that are within the spirit of the invention and scope of the claims.

EXAMPLE 1

Preparation of Au/TiO$_2$ Catalyst

Catalyst 1A: Chloroauric acid (0.25 g, Alfa Aesar) is dissolved in 400 mL of deionized water and the solution is heated to 70° C. The pH of the solution is then adjusted to pH 7.5 by the addition of 5% sodium hydroxide. Titania (10 g, Ishihara ST-01) is added to the solution and the mixture is stirred for 1 hour before cooling to room temperature. The mixture is then filtered, and the solid is recovered and washed by stirring in 1 liter of deionized water for 10 minutes and then filtering the mixture. The recovered solid is then washed and filtered in the same manner 3 more times, dried under vacuum at room temperature for 12 hours, heated to 120° C. in air and held for 2 hours, and finally heated to 400° C. and held for 4 hours. The catalyst analyzed for 1.3 weight % gold.

Catalyst 1B is prepared using the same method as described above, except that 10 grams of Degussa P25 titania is used instead of Ishihara ST-01 titania. The catalyst analyzed for 0.64 weight % gold.

EXAMPLE 2

Preparation of Au/Titania-Silica Catalyst

Silica (67 g, Grace Davison V-432), pre-dried in air at 400° C. for 4 hours, is charged into a 1000-mL round-bottom flask. A solution of titanium (IV) diisopropoxide bis (acetylacetonate) (14.28 g of 75% Ti($^i$OPr)$_2$(acac)$_2$ in isopropanol, Strem) in isopropanol (78 g) is added to the silica. The flask is rotoevaporated at 80° C. for 1 hour. The resulting solid is then heated in air at 10° C./minute to 800° C. and held at that temperature for 6 hours. The resulting solid consists of 2 weight % titanium on silica.

The same procedure as in Example 1A is then followed, except that 10 grams of the above-described titanium/silica is used in place of Ishihara ST-01 titania. The catalyst analyzed for 0.20 wt. % gold and 2.0 wt. % titanium.

Comparative Example 3

Preparation of Au/TS-1 Catalyst

Gold oxide (Au$_2$O$_3$, 120 mg) and ethylene glycol (80 g) are added to a 125 mL flask equipped with a stir bar. The reaction mixture is stirred at room temperature for 3 hours to give a purple solution before titanium silicalite TS-1 (10 g, containing 1.56 wt. % Ti) is added. The slurry is heated to 120° C. over a one hour period and reacted at 120° C. for one more hour before cooling to 23° C. Deionized water (40 g) is added to the slurry mixture and the solids are recovered by centrifuging and decanting the liquid, then washing the solids four times by slurrying in deionized water and centrifuging and decanting the water. The solids are dried in vacuum at 50° C. under 1 Torr pressure to give 9 grams of Au/TS-1. The catalyst is then calcined in air at 400° C. for four hours. The catalyst analyzed for 0.99 wt. % gold and 1.58 wt. % titanium.

Comparative Example 4

Preparation of Au/Silica Catalyst

Catalyst 4 is prepared using the same method as described in Example 3, except that 10 grams of silica gel (Davison Catalyst Grade) is used instead of TS-1. The catalyst analyzed for 0.77 weight % gold.

EXAMPLE 5

Production of Hydrogen Peroxide Using Catalyst 1–2 and Comparative Catalysts 3–3

A 100 mL pressure reactor equipped with a glass liner and a magnetic stir bar is charged with methanol (16 g), deionized water (2 g), and catalyst (50 mg). The reactor is pressurized to 1200 psig of nitrogen and then vented to one atmosphere. The reactor is then pressurized with approximately 65 psig hydrogen, followed by a mixture of 4% oxygen in nitrogen to a total pressure of approximately 1265 psig (see Table 1 for reaction pressures of the different runs). The reaction mixture is reacted at 30° C. for one to four hours (see Table 1 for the run times for the different runs). The gases are vented and the liquid analyzed for peroxides by iodometric titration and LC analysis to give the amount of hydrogen peroxide, as a weight percent of total solution.

Table 1 shows the reaction pressure and results for production of hydrogen peroxide using catalysts 1–4.

The results (see Table 1) show that the use of a Au/TiO$_2$ or Au/Titania-silica catalyst leads to the production of hydrogen peroxide in higher amounts when compared to comparative catalyst Au/TS-1. This result is surprising given the teachings of JP 07-241473 indicating that hydrophobic supports are necessary for production of hydrogen peroxide using gold supported catalysts. The results also show higher production of hydrogen peroxide when using Au/TiO$_2$ and Au/Titania-silica catalysts compared to Au/silica.

TABLE 1

Production of Hydrogen Peroxide.

| Run # | Catalyst | Hydrogen Pressure (psig) | Total Pressure (psig) | Run time (hr) | Amount H$_2$O$_2$ (wt. %) |
|---|---|---|---|---|---|
| 5A | 1A | 63 | 1263 | 1 | 0.034 |
| 5B | 1A | 64 | 1278 | 2 | 0.069 |
| 5C | 1B | 62 | 1260 | 1 | 0.024 |
| 5D | 1B | 65 | 1265 | 4 | 0.032 |
| 5E | 2 | 64 | 1268 | 1 | 0.027 |
| 5F * | 3 | 60 | 1269 | 1 | 0.022 |
| 5G * | 4 | 63 | 1276 | 1 | 0.022 |
| 5H * | 4 | 67 | 1258 | 2 | 0.02 |

* Comparative Examples.

We claim:

1. A process for producing hydrogen peroxide comprising reacting hydrogen and oxygen in an oxygenated solvent in the presence of a supported catalyst consisting essentially of gold and a support, wherein the support is selected from the group consisting of titania, zirconia, titania-silica, and zirconia-silica.

2. The process of claim 1 wherein the supported catalyst is comprised of from 0.01 to 10 weight percent gold.

3. The process of claim 1 wherein the oxygenated solvent is selected from the group consisting of water, C$_1$–C$_4$ alcohols, and mixtures thereof.

4. The process of claim 3 wherein the oxygenated solvent is water.

5. The process of claim 3 wherein the oxygenated solvent is methanol.

6. The process of claim 3 wherein the oxygenated solvent is a mixture of methanol and water.

7. The process of claim 6 wherein the molar ratio of methanol:water is in the range of from about 3 to about 6.

8. The process of claim 1 wherein a carrier gas is used in addition to the hydrogen and oxygen.

9. The process of claim 8 wherein the carrier gas is selected from the group consisting of helium, neon, argon, nitrogen, methane, and carbon dioxide.

* * * * *